United States Patent
Engel et al.

(10) Patent No.: US 7,831,105 B2
(45) Date of Patent: Nov. 9, 2010

(54) METHOD FOR DETERMINING THE IMAGE QUALITY OF AN OPTICAL IMAGING SYSTEM

(75) Inventors: Thomas Engel, Niedernissa (DE); Herbert Gross, Essingen (DE)

(73) Assignee: Carl Zeiss SMS GmbH, Jena (DE)

(*) Notice: Subject to any disclaimer, the term of this patent is extended or adjusted under 35 U.S.C. 154(b) by 500 days.

(21) Appl. No.: 10/533,603

(22) PCT Filed: Jun. 11, 2004

(86) PCT No.: PCT/EP2004/006302

§ 371 (c)(1),
(2), (4) Date: Apr. 29, 2005

(87) PCT Pub. No.: WO2004/111600

PCT Pub. Date: Dec. 23, 2004

(65) Prior Publication Data

US 2006/0072104 A1      Apr. 6, 2006

(30) Foreign Application Priority Data

Jun. 12, 2003   (DE)   ................ 103 27 019

(51) Int. Cl.
*G06K 9/40* (2006.01)
*G06K 9/20* (2006.01)
*G01B 9/00* (2006.01)
*A61B 3/10* (2006.01)

(52) U.S. Cl. .............. 382/254; 382/312; 250/201.9; 358/504; 358/509; 351/205; 356/124

(58) Field of Classification Search ......... 382/254–255, 382/270–271, 274, 312, 325; 356/124–127; 351/205, 208, 221, 246; 250/201.9

See application file for complete search history.

(56) References Cited

U.S. PATENT DOCUMENTS 5,066,119 A   11/1991  Bertand
(Continued)

FOREIGN PATENT DOCUMENTS

DE   38 42 144   6/1990
(Continued)

OTHER PUBLICATIONS

Literature: Joseph Geary, "Wavefront sensors", SPIE Press 1995.
Literature: Daniel Malacara, "Optical Shop Testing", Wiley Verlag 1992.
(Continued)

*Primary Examiner*—Manav Seth
(74) *Attorney, Agent, or Firm*—Frommer Lawrence & Haug LLP

(57) ABSTRACT

The invention is directed to a method for determining the image quality of an optical imaging system and to the use of the method according to the invention for determining the influence of samples on the amplitude distribution and phase front distribution of the illumination light, of which the amplitude distribution is known in particular. The invention comprises the following steps: adjusting the subassemblies relative to one another in such a way that it is possible to project images of a sample on the detection device; recording a plurality of images of the sample from different reference planes near the focus plane; improving the image quality by image processing, particularly to reduce noise, to compensate for local variations in sensitivity of the detection device, and to center the intensity centroids respectively on a predetermined location in the images; computational linking of the spatially resolved image information, of adjustment values and system variables relating to the optical imaging system, and of information concerning the sample with the aim of determining characteristic numbers that are characteristic of the wavefront deformation caused by the imaging system; and outputting the characteristic numbers and associating them with the imaging system for describing the image quality.

24 Claims, 7 Drawing Sheets

U.S. PATENT DOCUMENTS

| | | | | |
|---|---|---|---|---|
| 5,208,648 A | * | 5/1993 | Batchelder et al. | 356/237.1 |
| 5,220,403 A | * | 6/1993 | Batchelder et al. | 356/450 |
| 5,367,375 A | * | 11/1994 | Siebert | 356/520 |
| 5,475,197 A | * | 12/1995 | Wrobel et al. | 219/121.69 |
| 5,526,113 A | * | 6/1996 | Lengyel et al. | 356/124.5 |
| 6,084,227 A | * | 7/2000 | Rhoads | 250/201.9 |
| 6,094,413 A | * | 7/2000 | Guerra | 369/275.1 |
| 6,222,621 B1 | * | 4/2001 | Taguchi | 356/124 |
| 6,271,914 B1 | * | 8/2001 | Frey et al. | 356/124 |
| 6,271,915 B1 | * | 8/2001 | Frey et al. | 356/124 |
| 6,278,100 B1 | * | 8/2001 | Friedman et al. | 250/201.9 |
| 6,452,631 B1 | * | 9/2002 | Hsu et al. | 348/254 |
| 6,525,302 B2 | * | 2/2003 | Dowski et al. | 250/201.2 |
| 6,646,729 B2 | * | 11/2003 | van der Laan et al. | 356/124 |
| 6,674,519 B2 | * | 1/2004 | Mui | 356/121 |
| 6,781,681 B2 | * | 8/2004 | Horwitz | 356/124.5 |
| 6,795,580 B1 | * | 9/2004 | Janko et al. | 382/199 |
| 6,859,192 B1 | * | 2/2005 | Ogawa | 345/77 |
| 6,987,255 B2 | * | 1/2006 | Smith | 250/201.9 |
| 7,036,934 B1 | * | 5/2006 | Youssefi et al. | 351/221 |
| 7,098,433 B2 | * | 8/2006 | Suzuki et al. | 250/201.9 |
| 7,307,707 B2 | * | 12/2007 | Wegmann | 356/124 |
| 7,425,067 B2 | * | 9/2008 | Warden et al. | 351/205 |
| 7,460,288 B2 | * | 12/2008 | Liang | 359/205.1 |
| 2002/0057495 A1 | | 5/2002 | Kuramoto | |
| 2006/0256226 A1 | * | 11/2006 | Alon et al. | 348/335 |

FOREIGN PATENT DOCUMENTS

| | | |
|---|---|---|
| DE | 101 54 125 | 5/2003 |
| EP | 1 079 223 | 2/2001 |
| EP | 1 246 014 | 10/2002 |
| JP | 10-170399 | 6/1998 |
| WO | 95/34800 | 12/1995 |
| WO | 99/66308 | 12/1999 |

OTHER PUBLICATIONS

Literature: Joseph Geary, "Wavefront sensors", SPIE Press 1995; Chapters 3 (pp. 27-51), 4 (pp. 53-65), 5 (pp. 67-87), 6 (pp. 89-103), 8 (pp. 125-136), and 10 (pp. 151-167).

Literature: Daniel Malacara, "Optical Shop Testing", Wiley Verlag 1992; Chapters 8 (pp. 265-314), 10 (pp. 367-396) and 11 (pp. 397-426),.

* cited by examiner

Example for Zernike evaluation in an AIMS fab system at 248 nm:

| Indexing after fringe scaling | Physical meaning | Analytic without objet space defocusing | Iterative without object space defocusing g | Iterative with object space defocusing | |
|---|---|---|---|---|---|
| | | | | static Zernike value | Linear coefficient in object space defocusing |
| 1 | | 0 | 0 | 0 | 0 |
| 2 | | 0,00851 | 0,02387 | 0,0351 | 0,12928 |
| 3 | | 0,01144 | -0,02163 | -0,02176 | -0,80338 |
| 4 | Defocusing | -0,06169 | -0,03453 | -0,0377 | -2,15459 |
| 5 | Astigmatism | -0,02603 | -0,04841 | -0,04918 | 0,24001 |
| 6 | Astigmatism | -0,03546 | 0,02668 | 0,05723 | -0,26836 |
| 7 | Coma | -0,06889 | -0,08017 | -0,04555 | 0,9295 |
| 8 | Coma | -0,05611 | 0,07481 | 0,05676 | -0,23595 |
| 9 | Spherical | -0,07892 | 0,00781 | -0,01562 | -7,01915 |
| 10 | Trefoil | 0,01159 | -0,03469 | -0,00218 | -13,8727 |
| 11 | Trefoil | 0,02109 | 0,0139 | -0,02059 | 0,29738 |
| 12 | 2nd order Astigmatism | -0,00369 | 0,07178 | 0,01328 | 0,80823 |
| 13 | 2nd order Astigmatism | -0,04723 | -0,00157 | 0,02011 | 5,50041 |
| 14 | 2nd order coma | -0,054 | -0,11813 | 0,04267 | 0,32948 |
| 15 | 2nd order coma | -0,06647 | 0,03985 | 0,0483 | 0,55088 |
| 16 | 2nd order spherical aberration | -0,09815 | 0,13668 | -0,12642 | -0,15332 |
| 17 | Quadrafoil | 0,0002 | -0,00802 | -0,00327 | -7,96513 |
| 18 | Quadrafoil | -0,0086 | 0,06882 | 0,03479 | 0,47989 |
| 19 | 2nd order trefoil | 0,04277 | 0,10738 | 0,03978 | 1,77909 |
| 20 | 2nd order trefoil | 0,02762 | -0,03653 | 0,03893 | -0,87237 |
| 21 | 3rd order spherical aberration | -0,00675 | -0,02135 | -0,02458 | 6,92178 |
| 22 | 3rd order spherical aberration | -0,06507 | -0,03913 | -0,06061 | 0,4165 |
| 23 | 3rd order coma | -0,02945 | 0,21074 | -0,10287 | -1,03012 |
| 24 | 3rd order coma | -0,08353 | -0,0928 | -0,07187 | -1,20287 |
| 25 | 3rd order spherical aberration | -0,07074 | -0,07812 | 0,20921 | 0,23704 |
| | Defocusing in image space /mm | Residual | Residual | Residual | |
| Peak-to-Valley residuals for all focus planes | -85,5 | 0,13524 | 0,0644 | 0,08484 | |
| | -42,75 | 0,11442 | 0,04932 | 0,05203 | |
| | 0 | 0,09006 | 0,03805 | 0,03563 | |
| | 42,75 | 0,07737 | 0,04418 | 0,0921 | |
| | -85,5 | 0,06364 | 0,06757 | 0,15666 | |
| | Mean | 0,096146 | 0,052704 | 0,084252 | |
| RMS residuals for all focus planes | -85,5 | 0,03039 | 0,0201 | 0,01379 | |
| | -42,75 | 0,02542 | 0,01774 | 0,01162 | |
| | 0 | 0,02118 | 0,01561 | 0,01062 | |
| | 42,75 | 0,01825 | 0,01477 | 0,01269 | |
| | 85,5 | 0,01677 | 0,01716 | 0,02066 | |
| | Mean | 0,022402 | 0,017076 | 0,013976 | |

Fig.7

METHOD FOR DETERMINING THE IMAGE QUALITY OF AN OPTICAL IMAGING SYSTEM

CROSS-REFERENCE TO RELATED APPLICATION

This application claims priority of International Application No. PCT/EP2004/006302, filed Jun. 11, 2004 and German Application No. 103 27 019.1, filed Jun. 12, 2003, the complete disclosures of which are hereby incorporated by reference.

BACKGROUND OF THE INVENTION a) Field of the Invention

The invention is directed to a method for determining the image quality of an optical imaging system substantially comprising an illumination device, a sample holder with sample, imaging optics, and at least one spatially resolving detection device. The invention is further directed to the use of the method according to the invention for determining the influence of samples on the amplitude distribution and phase front distribution of the illumination light, of which, in particular, the amplitude distribution is known.

b) Description of the Related Art

In connection with the manufacture of high-quality imaging optics, particularly for use in microscopy, an assessment of the achievable image quality is required.

It is known to determine, at least semi-quantitatively, the image quality of imaging systems which have few lenses and which can also comprise complex optical subassemblies. For this purpose, it is customary to carry out so-called star tests, wherein circular objects below the resolution limit of the specific optics are used as test samples. Based on the behavior of the diffraction patterns in the imaging of these samples with defocusing devices and the symmetries contained therein, the quality of imaging can be determined qualitatively to a degree of accuracy that is usually deficient.

For example, a closed first diffraction ring at the edge of the first Rayleigh region can be considered as a sign of diffraction-limited optics. It is disadvantageous that this assessment must be considered only as integral information. And more specific quantitative information about the distribution of the rest of the imaging errors to different error types, such as a spherical aberration, coma or astigmatism, can also not be gained in this way.

In another procedure, the fit of the individual optical components is checked by interferometry to arrive at assertions concerning the geometric errors, e.g., of a lens body, which can then be converted to system-dependent imaging errors.

In this connection, system-dependent influencing factors are also already detected insofar as the measurement wavelength of the interferometer conforms to the working wavelength or wavelength spectrum of the illumination light. In more complicated optical systems, specially adapted interferometers are also occasionally used to check the image quality under given constraints and at the correct working wavelength with respect to the total imaging system.

This is applied, for example, in imaging objectives for steppers or scanners to be used in semiconductor microlithography. This procedure requires a relatively high technical complexity and is therefore very cost-intensive and not usually employed in connection with microscope manufacture.

Further, it is known to measure the wavefront of optical imaging systems with so-called Hartmann or Shack-Hartmann wavefront sensors or with sensors operating on similar principles. This also calls for relatively elaborate technology and, for that reason, the corresponding measuring systems are usually only designed to provide measurements only for different subsystems which, however, have similar interfaces, e.g., microscope objectives for microscopy.

In this connection, a continual problem, particularly for microscope producers, is the lack of an available general testing procedure that would make it possible to determine the image quality as accurately as possible for the different optical imaging systems which differ from one another with respect to optical, geometric and mechanical parameters.

Also, this problem exists not only during the manufacture and adjustment processes, but also in connection with quality control of imaging systems that are already in use by the customer.

Further, the determination of the image quality for a plurality of field positions of the imaging system is uneconomical or inaccurate in all of the previously known procedures.

The following source literature is cited in this connection: Joseph Geary, "Wavefront sensors", SPIE Press 1995, and Daniel Malacara, "Optical Shop Testing", Wiley Verlag 1992.

OBJECT AND SUMMARY OF THE INVENTION

Proceeding from this prior art, it is the primary object of the invention to further develop the previously known methods in such a way that a more accurate quantitative determination of the image quality of optical imaging systems is possible in a more economical manner and the results of the determination of image quality can also be used to determine the influence of initially unknown samples on the amplitude distribution and phase front distribution of the illumination light, of which the amplitude distribution, in particular, is known.

According to the invention, the following method steps are provided in a method of the type mentioned above:

adjusting the subassemblies relative to one another in such a way that it is possible to image a sample on the detection device;

recording a plurality of images of the sample from different adjusting or reference planes near the focus plane, wherein the detection device is adjusted relative to the image plane, the sample is adjusted relative to the object plane, or the objective is adjusted relative to the sample;

improving the image quality by means of image processing, particularly to reduce noise, to compensate for local variations in sensitivity of the detection device, and to center the intensity centroids respectively on a predetermined location in the images;

computational linking of spatially resolved image information, of adjustment values and system variables relating to the optical imaging system, and of information concerning the sample with the aim of determining characteristic numbers that are characteristic of the wavefront deformation caused by the imaging system; and outputting the characteristic numbers and associating them with the imaging system for description of the image quality.

The basic idea of the invention consists in initially making a plurality of recordings, a so-called image stack, of a sample, preferably a sample with a pinhole, with the operative optical imaging system, of which imaging parameters such as wavelength, numerical aperture, sigma (as degree of coherence of the illumination), scanning, image size (in pixels), magnification, and so forth, are known, wherein the individual recordings of this image stack come from different focusing distances, i.e., from different defocusing adjustments near the focus plane.

In other words, the sample is imaged repeatedly, each time with different defocusing, on the spatially resolving detection device and the image information that is obtained by pixels is stored. This provides a stack of layer images one on top of the other in which every image is made up of a multitude of image information in the form of intensity values.

The individual images of the image stack are initially subjected to measures for improving the image quality which are known, per se, in the technical field of image processing. These measures relate particularly to reducing noise or improving the signal-to-noise ratio;
compensating for local sensitivity differences of the individual sensor elements (pixels) of the detection device;
linearizing the dynamic range of the sensor elements;
subtracting background noise;
centering the intensity centroids in the individual images on a predetermined location; and/or
cutting out relevant image portions, e.g., from axial points and field points, while preventing edge cropping.

These measures for improving image quality are particularly advantageous with respect to the accuracy that can be achieved with the additional method steps according to the invention.

After improving the image quality, the image information and all relevant data such as adjusting values and system variables relating to the optical imaging system and information concerning the sample (type and characteristics of sample) are transferred to the evaluating device for combining based on predetermined computing programs.

Along with the transfer to the evaluating device, it is decided at the same time whether or not to carry out a deconvolution of the image information in order to separate the sample influences from the influences of the imaging system and illumination. This decision is made depending, for example, on the diameter of a pinhole $d_{PH}$ in the sample compared to the object-side Airy diameter $d_{Airy}$ of the imaging system and on the accuracy to be achieved. The corresponding control parameters for the deconvolution, such as pinhole diameter or, e.g., parameters for a Tikhonov regularization, are likewise entered into the evaluating device in case it is decided to carry out the deconvolution.

Further, the following must be determined prior to the evaluation or provided for the evaluation:

the desired accuracy of the evaluation or of the results of the evaluation;
the quantity of characteristic numbers which are to be determined in the assessment of the image quality or upon which the assessment is to be based;
the selection of a computing program to be used for the evaluation from a stock of available computing programs;
termination criteria for the evaluation, for example, the magnitude of the residual error, the number of iteration cycles, or the duration of the evaluation;
whether the evaluation is to be carried out in one step or in multiple steps; in the latter case, the aim is to arrive at results faster, to increase convergence and stabilize the process; and
whether or not the defocusing in the object space, i.e., the adjustment of the sample relative to the object plane or the adjustment of the objective relative to the sample, must be taken into account during the evaluation; in this case, e.g., the parameter space for an iteration calculation to be provided must be increased so that influences originating from the object space defocusing can be taken into account.

In a further development of the operating sequence, pupil functions can be taken into account, e.g., the results of the measurement of the real illumination by pupil imaging using the Bertrand system or the theoretically determinable apodization of the pupil as a characteristic of the design of the imaging system.

In a particularly preferred embodiment of the invention, the characteristic numbers are determined by analytic evaluation in a first step and by iterative evaluation in a subsequent second step, and the results from the first step are transferred to the second step as starting values and are further processed until a given termination criterion is reached.

The first step is used for quickly finding the target area of the results for the characteristic numbers with a robust method, but can already deliver results with limited accuracy. The second step, which is based on the, as yet, inexact results of the first step or which makes use of these results as starting values, serves to determine more exact results.

In the first, analytic step, a first set of characteristic numbers which are equivalent for the image quality are determined, e.g., in the form of Zernike polynomials up to a desired order of magnitude. For this purpose, the information or data introduced in the evaluation are analyzed, for example, by the extended Zernike method.

Generally, the characteristic numbers resulting from the analytic evaluation do not yet satisfy the requirements for accuracy in the assessment of the image quality of an optical imaging system. Therefore, the analytic determination is followed by an iterative process.

The iterative evaluating process substantially incorporates the image information, the image recording parameters of the optical imaging system, the characteristic numbers determined in the preceding analytic evaluation step for image quality, and residuals as residual errors between retrieved and measured intensity distribution.

The iterative phase of the evaluation can be carried out either pixel by pixel with error minimization, e.g., based on merit functions or derived method variants, or two-dimensionally (taking into account the image contents). The iterative method to be used is preferably based on the Gerchberg or Gerchberg-Saxton principle, optionally associated with the Levenberg-Marquardt, Gaussian, or non-least-square optimization methods, known in technical circles.

In addition, it is also conceivable that the iterative evaluation is not preceded by an analytic evaluation but, rather, that the image information and specifications of the imaging system are furnished directly to the iterative evaluation, wherein the image information which is not dependent upon the sample and is possibly deconvolved is taken into account. However, starting with the analytic evaluation has the considerable advantage that starting values are available for iteration which appreciably increase the convergence and the certainty of actually finding the absolute minimum of residuals.

When defocusing is carried out during the recording of the image stack in the object space and the object space defocusing is also to be taken into account in the evaluation, the parameter space for the iteration must be increased, preferably doubled in linear development, so that one or more parameters describing the defocusing can be associated with every characteristic number for the image quality and the defocusing effects are accordingly taken into account in the iteration. In the linear case, the characteristic numbers then have the following form:

$$c_i = c_{i,f} + \Delta z \cdot c_{i,d},$$

where $c_{i,f}$ is the characteristic number of the image quality, $\Delta z$ is the advance in direction of the optical axis, and $c_{i,d}$ is the defocusing term.

The data and information upon which the iteration is to be based can be taken over selectively from different antecedent steps of the determination of measurement values or from the results of theoretical system calculation.

For a robust and reliable or stable evaluation, known global optimization methods can be incorporated in the iterative evaluation, e.g., simulated annealing or self-learning computing processes.

The output of the evaluation results is provided in the form of characteristic numbers that describe the image quality, preferably as Zernike coefficients, as image information, in the form of residuals as residual errors between retrieved and measured intensity distribution, and as defocusing parameters associated with the determined Zernike coefficients.

Further, the method according to the invention is used for calculating the imaging errors that are now also known along with the image quality from the images of any, initially still unknown, samples recorded by the same imaging system.

For this purpose, the image information obtained with the initially still unknown samples is subjected to post-processing in which the characteristics of the imaging system are taken into account by deconvolution. In this way, the specific device characteristics are taken into account and also corrected at the same time when imaging the sample. It is advantageous when deconvolving the characteristics of the imaging system from the sample images, to correct the influence of the finite object size from the point images at the same time.

In this way, it is also possible to factor in the influence, e.g., of a stepper in microlithography in the characteristics of an image by convolution again in order to correct the characteristics of the measuring system and accordingly obtain an image such as would have been generated by the stepper.

The change of reference plane for the recording of the image stack should advantageously be carried out in steps to be determined.

The image stack can be recorded by means of an individual spatially resolving detection device, wherein an adjustment of the detection device or of the sample is required. Alternatively, it is also possible to record the image stack using a plurality of spatially resolving detection devices which must then be arranged in the desired reference planes. In the latter case, it is possible to record all images of the image stack simultaneously and also, depending on the control, to record the images belonging to an image stack successively in time.

When the image quality is to be determined in relation to different positions in the visual field of the imaging system, it can be provided in a development of the invention that the determination of the characteristic numbers is based on a plurality of samples that are positioned adjacent to one another in the sample holder. Accordingly, for each recording, the samples supply image information that can be associated with the respective positions.

It is likewise possible to arrange a sample with a plurality of objects in the visual field of the imaging system so that information concerning the image errors in the visual field can be determined in an image stack. In arranging the sample with respect to the characteristics of the imaging system, it is advantageous to ensure that the objects do not influence one another in the arrangement.

The samples can be binary objects, i.e., pure amplitude objects, e.g., lithography masks.

In another particularly preferred embodiment of the invention, the determination of all of the data and information supplied in the evaluation and the evaluation, including the output of the evaluation results, take place automatically.

In some cases, it is advantageous when obtaining the image stack to use an exposure control which, in spite of the changed reference planes, ensures an optimal illumination of the sample so that the signal-to-noise ratio in the images is optimized already during the recording.

For illumination of the sample, it is also conceivable to use a laser beam having a beam waist in the object plane, which typically leads to a low sigma value and also to a Gaussian intensity distribution in the pupil of the imaging system.

In a further development of the method according to the invention, the determination of the influence of initially unknown samples on the amplitude distribution and phase front distribution of the illumination light, of which this distribution is known, is provided with the following method steps:

determining the wavefront deformation characterizing the optical imaging system based on a sample whose characteristics are known;

exchanging this sample for a sample which is to be examined and whose characteristics are initially still unknown;

determining the wavefront deformation again while taking into account the influence of the sample to be examined after the method steps described above;

separating the characteristic numbers for the image quality resulting under the influence of the unknown sample and the characteristic numbers for the image quality that were determined without the influence of the unknown sample; and determining the characteristics of the initially unknown sample from the results of this separation.

Determining the characteristics of samples in the manner mentioned above is connected to the preceding method steps and assumes an operative imaging system for which the characteristic numbers characterizing the image quality are already available. With respect to this imaging system, the image parameters, such as wavelength of the illumination light, numerical aperture, sigma, scanning, magnification, image size (in pixels) and defocusing parameters (associated with the characteristic numbers for the image quality), are also known or can be determined.

An, as yet, unknown sample to be examined is placed in this imaging system with known imaging characteristics, or an image of the sample is projected therein. A series of images, that is, an image stack, of the sample to be examined is recorded. In this case also, the focus distance is changed for each image as was already described. A defocusing-dependent exposure control can also be used for this purpose to adapt the illumination of the sample to the respective focus plane.

The images of the sample to be examined which are obtained in this way are processed with respect to their quality and the signal-to-noise ratio is again improved, e.g., by dark image correction, the pixels are linearized (flat-fielding), the background noise is subtracted, the intensity centroid is centered in every image, relevant image portions are cut out and/or noise filtering can be provided, so that an image stack with information-containing images that can be evaluated is supplied for further processing.

The centering of the intensity centroid using the data values contained in the image can be carried out directly, or by means of correlation since the images do not now terminate at the edge of the camera field (in contrast to the recording of an image stack for determining the characteristic numbers of the pure imaging system), or can be carried out purely mechanically when the lateral sequence in the X,Y-direction has been determined beforehand in relation to the z-position for the imaging system in the respective reference plane, possibly also with interpolation of intermediate planes.

The image information resulting after this processing, the information concerning the imaging system, the information concerning the adjustment with respect to each image, and the characteristic numbers for the image quality, are now transferred to an evaluating device.

The following are supplied, in particular, for the evaluation:

- the desired accuracy of the evaluation or of the evaluation results;
- the quantity of characteristic number for describing the image quality, e.g., the quantity of Zernike coefficients upon which the evaluation and results are to be based;
- selection of the computing methods and optimization methods to be used insofar as the evaluating device has a plurality of suitable computational algorithms;
- preset of the termination criterion for an iterative evaluation, e.g., residual errors, number of iterative cycles, duration of evaluation;
- the one-step or multiple-step evaluation; the aim of the multiple-step evaluation is to shorten the computing time, increase the convergence and the certainty of finding results in the iteration, or also to stabilize the computing process;
- taking into account an object space defocusing that may have been carried out, for which purpose the parameter space for the iteration calculation should be increased in order to be able to take into account a variation of the characteristic numbers of the image quality that result from the object defocusing; and
- a criterion for the transition from an analytic evaluation to an iterative evaluation, e.g., residual errors, duration of evaluation, and so on.

According to the invention, the characteristic numbers for the image quality of the imaging system are again determined analytically with the, as yet, unknown sample in a first step of the multiple-step evaluation. For this purpose, Zernike polynomials are determined up to a desired order, e.g., according to the extended Zernike method.

The iterative determination of the characteristic numbers for the image quality is carried out in a subsequent second step of the evaluation, wherein the results of the preceding analytic evaluation are used as starting values for the iteration in order to increase the convergence of the iteration method in this way.

Input quantities for the iterative step of the evaluation are again the image information, the characteristic numbers for image quality (e.g., in the form of Zernike coefficients) and, for purposes of comparison, residuals as residual errors between retrieved and measured intensity distribution in the images of the sample, and, as the case may be, the system parameters for the defocusing characteristics.

The iteration can again be carried out either pixel by pixel with error minimization, e.g., according to the Gerchberg-Saxton method, followed by optimization methods, e.g., the non-least-square method, Levenberg-Marquardt, or the like.

For a robust and reliable or stable evaluation, known global optimization methods can be incorporated in the iterative evaluation, e.g., simulated annealing or self-learning computing processes.

It is preferable to use iterative methods operating pixel by pixel because information must be obtained about a sample that is initially still unknown. The use of the two-dimensional iterating method is recommended preferably with samples having only extensive structures and relatively small gradients, e.g., when examining certain biological samples.

In an embodiment of the method according to the invention, the object space defocusing is taken into account and, in connection with this, the parameter space for the iteration is enlarged so that every characteristic number determined for the image quality can be associated with defocusing parameters and the defocusing effects are taken into account in the iteration. The values of the imaging system can be used by themselves as starting values.

The evaluation results in characteristic numbers of the image quality of the imaging system which are influenced by the sample to be examined and which consequently deviate from the characteristic numbers that were determined beforehand with a known sample.

The following procedure can be carried out for separating the sample characteristics from the characteristics of the imaging system:

1. A best focus determination is carried out for the obtained image stack and, based on the characteristic numbers of the image quality of the imaging system, a simulated focus series of very simple object structures, e.g., of a point image, an edge, or column, is calculated only for the imaging system at the focus positions of the measured image stack. By deconvolving the images of the measured image stack with corresponding images of the simulated image stack, the images of the measured image stack are freed from the characteristics of the imaging system. The characteristic numbers of the image quality for the sample by itself are determined from this measured image stack.

With the sample-oriented characteristic numbers of the image quality determined in this way, it is possible to calculate backward to the amplitude distribution, phase distribution and/or intensity distribution in the object plane for the sample by itself in order to obtain the sample characteristics. In principle, a measured image series can also be used instead of the simulated image stack, although computation will be less accurate.

2. The characteristic numbers of the imaging system, as were determined with the known sample according to the method steps described in the beginning, are subtracted from the characteristic numbers of the imaging system that were determined under the influence of the sample to be examined. In this way, the sample characteristics are separated and can be outputted in suitable form, e.g., in the form of information concerning spatial amplitude distribution or intensity distribution, spatial phase distribution, as isoamplitudes, isointensity surfaces, or isophase surfaces.

Particularly when using pixel-oriented calculation methods, an unwrapping of the phase surfaces may be necessary. In this case also, it is possible to calculate backward to the amplitude distribution, phase distribution or intensity distribution in the object plane with the sample-oriented characteristic numbers determined in this way in order to make the sample characteristics more precise.

3. Based on the characteristic numbers of the image quality for the imaging system with the known sample on the one hand and the characteristic numbers of the image quality of the imaging system without the sample to be examined on the other hand, the optical field distributions in the object plane are determined and deconvolved by calculating backward and the information concerning the characteristics of the sample by itself are obtained.

The output of results is preferably carried out in the form of image information, characteristic numbers for image quality, e.g., Zernike coefficients, defocusing parameters for the measured Zernike coefficients, information concerning amplitude, phase or intensity that can be calculated back to the influence of the sample.

In principle, the output of results is carried out in the same way in the three variants indicated above, but different additional information can be outputted at the same time depending on the selected variant.

The method according to the invention will be described in the following with reference to an embodiment example.

BRIEF DESCRIPTION OF THE DRAWINGS

In the accompanying drawings:

FIG. 7 shows proof of the image quality of an optical imaging system according to FIG. 5 in the form of a value table.

DESCRIPTION OF THE PREFERRED EMBODIMENTS

Figure 1:
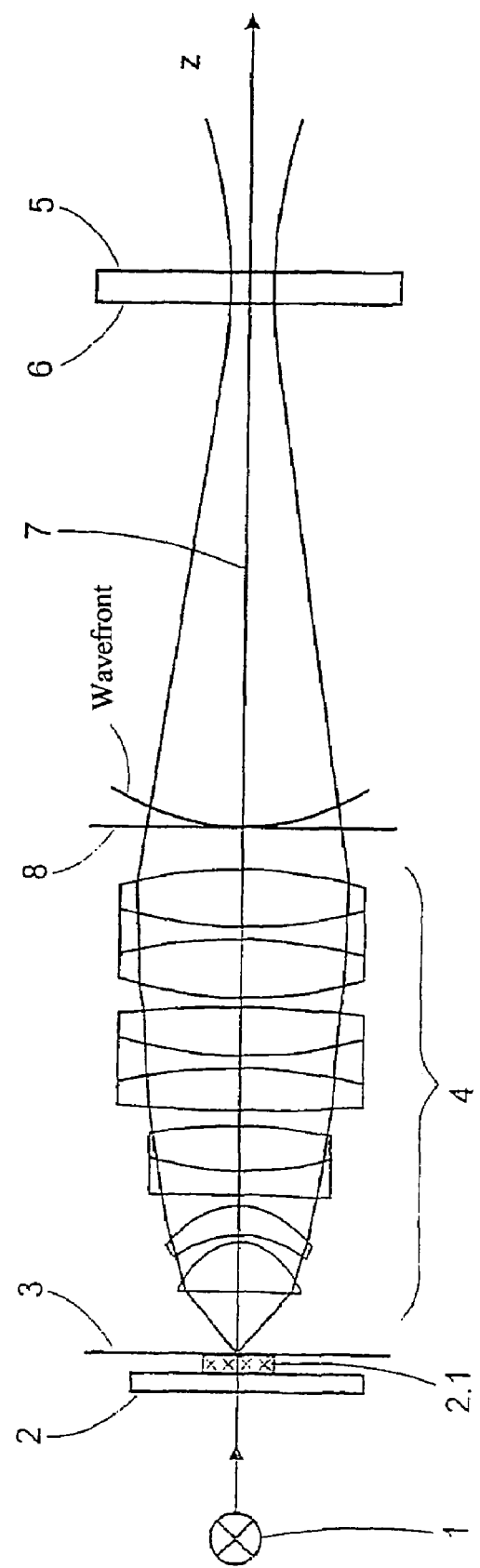
FIG. 1 shows a schematic view of optical subassemblies used in an optical imaging system.

The subassemblies according to FIG. 1 substantially comprise an illumination device 1, a sample holder 2 with a sample 2.1 which is positioned in or near the object plane 3, an objective 4, and a CCD camera 5, as spatially resolving detection device, which is positioned in or near the image plane 6 of the objective 4. The subassemblies have a common optical axis 7 which does not necessarily extend in a straight line.

The subassemblies are adjusted relative to one another in a first method step in such a way that it is possible for the sample 2.1, which can exist physically or in the form of an image, to be projected onto the receiving surface of the CCD camera 5. The receiving surface of the CCD camera 5 comprises an array of sensor elements (pixels), and information concerning the intensity of the impinging illumination light influenced by the sample can be read off at the output thereof.

Figure 2:
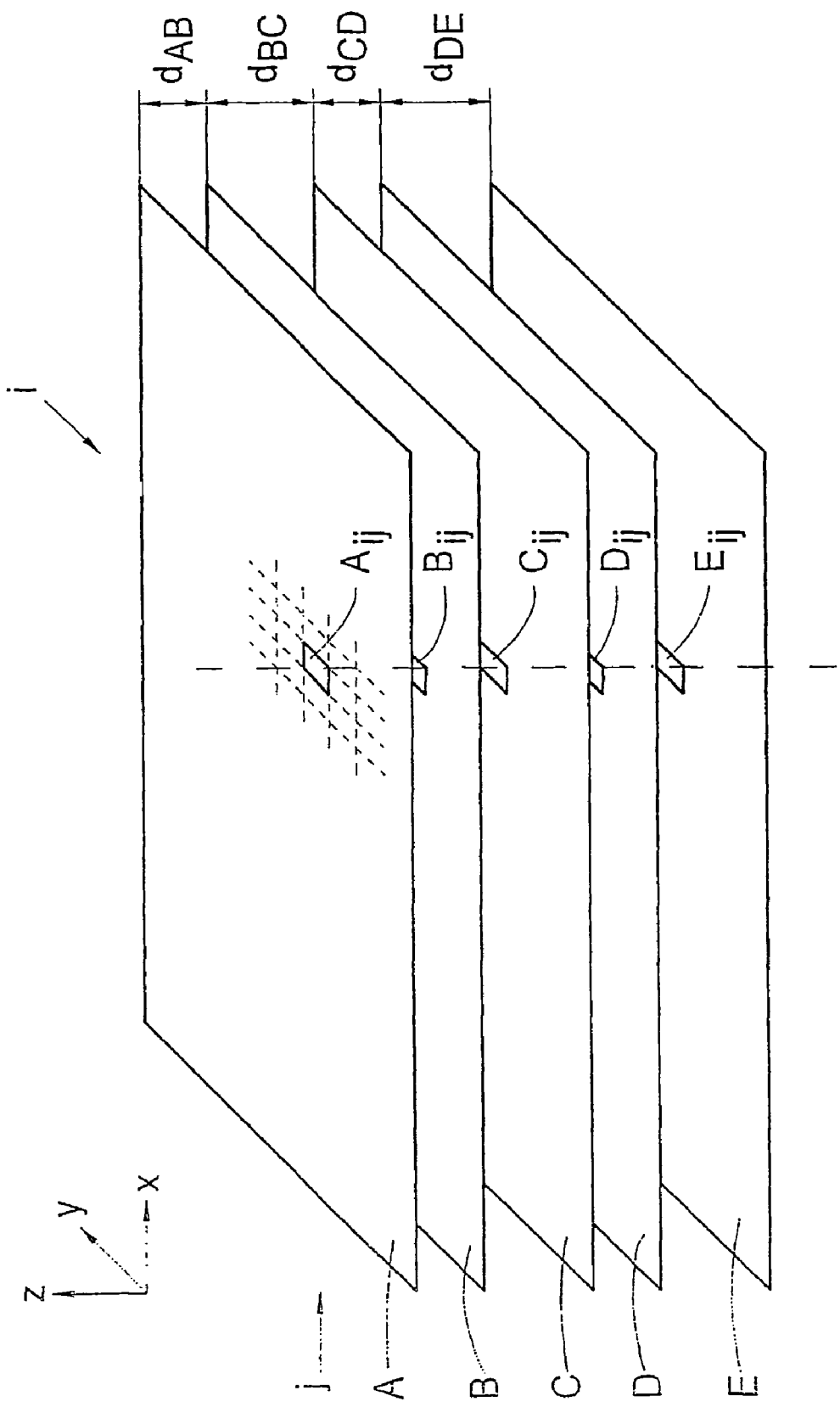
FIG. 2 shows a simplified view of an image stack comprising a plurality of images of a sample obtained from different focus settings.

In a second method step, images are recorded from different defocusing ranges and result, in their entirety, in an image stack as is shown schematically in FIG. 2. The individual images are designated by A, B, C, D and E. The image stack extends in the direction of the optical axis 7 over a depth corresponding to the sum of distances $d_{AB}$ to $d_{DE}$.

Of course, the quantity of images is not restricted to the quantity shown here; rather, substantially any quantity can be chosen. However, it is recommended that an odd-number quantity be selected in order to obtain, by specific adjustment, an image from the best focus plane and the rest of the images from defocusing ranges with defocusing symmetric to the best focus plane.

Each of the images A to E comprises a grid of image information arranged in rows i and columns j. This image information is made up of intensity values, whose magnitude corresponds to the output signal of an associated sensor element (pixels) of the receiving surface of the CCD camera 5, and represents the image of the sample.

In FIG. 2, the image information $A_{ij}$, $B_{ij}$, $C_{ij}$, $D_{ij}$ and $E_{ij}$ which is arranged successively in direction of the optical axis 7 ideally represents one and the same area of the sample recorded from different focus planes and, therefore, also with different intensity values.

The direction of the optical axis 7 corresponds to the coordinate direction Z of the, ideally, Cartesian coordinate system, while each of the images lies in the plane defined by the coordinates X and Y.

In principle, the image information can be obtained by means of a VIS microscope, a UV microscope or another imaging system.

Figure 3:
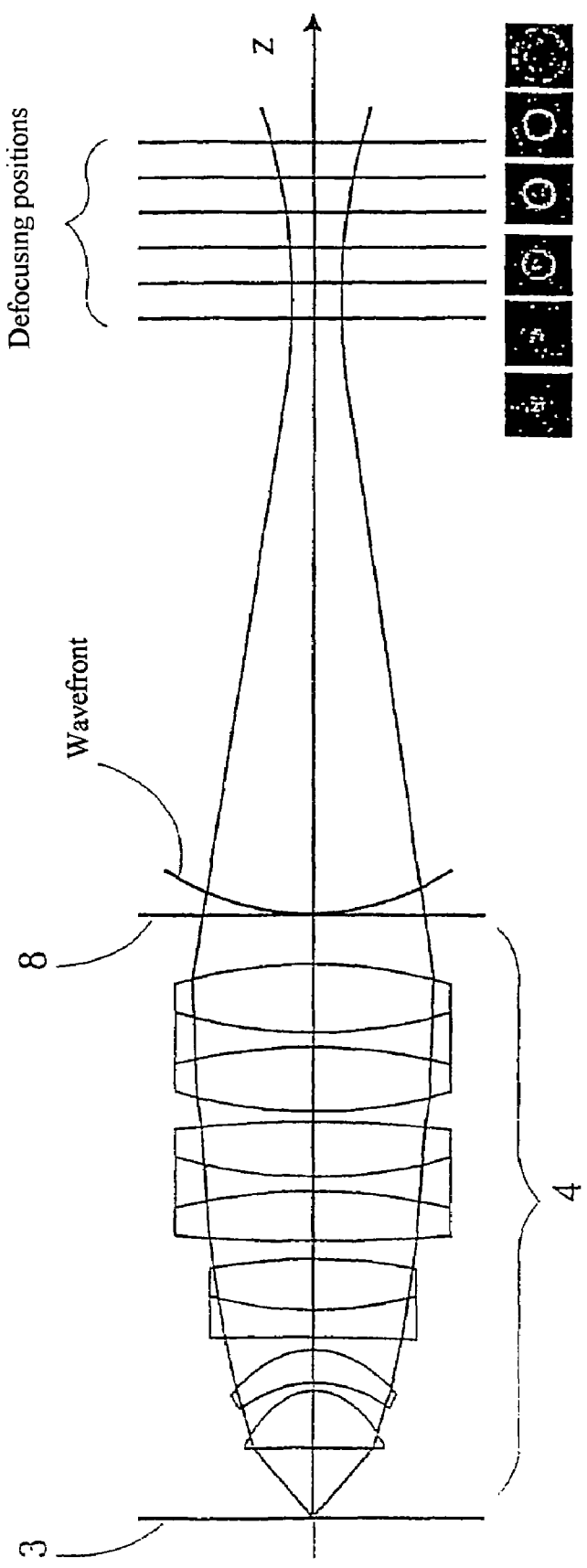
FIG. 3 shows an example for the recording of an image stack with defocusing within the image space.

As is shown in FIG. 3, the recording of the image stack can be carried out, for example, by adjusting the CCD camera 5 relative to the image plane 6, i.e., the recordings are obtained with defocusing within the image space. The distance between sample 2.1 and objective 4 remains unchanged. Depending on the different reference planes, a pinhole in the sample 2.1 causes the intensity caustic shown in FIG. 3.

Figure 4:
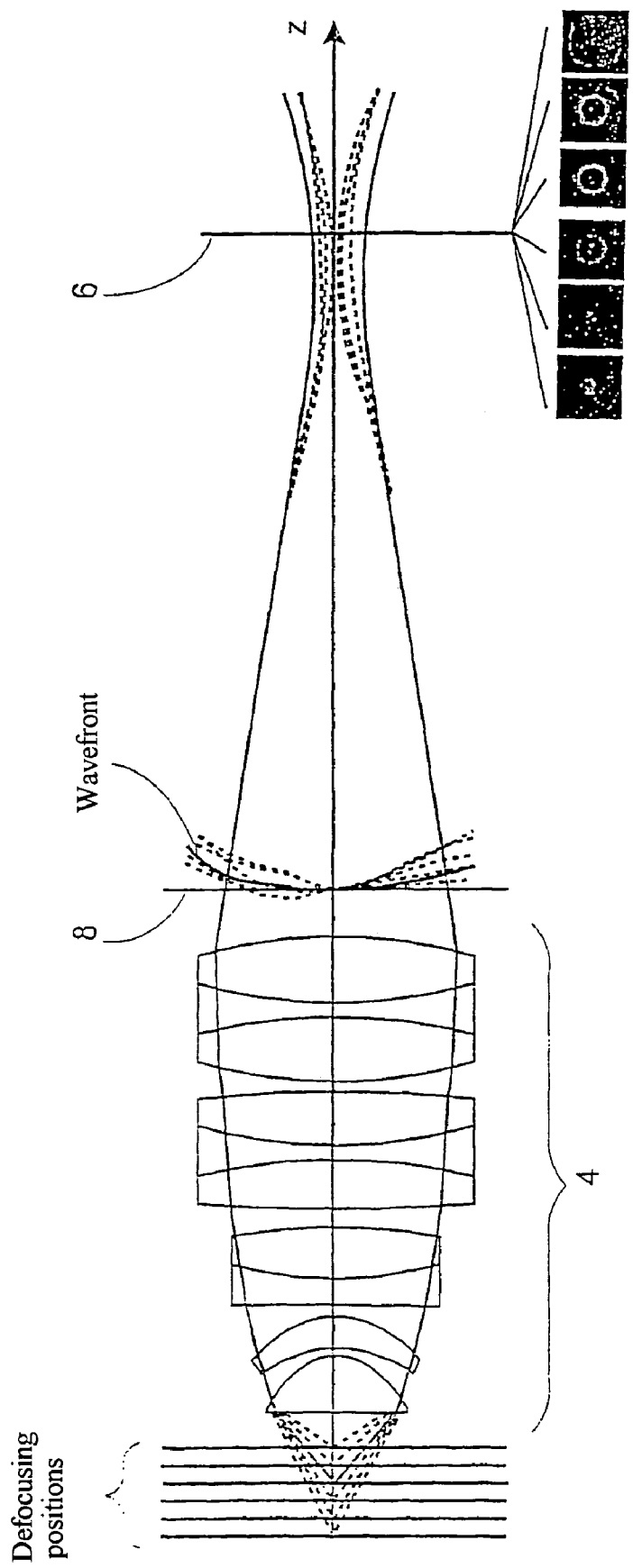
FIG. 4 shows an example for the recording of an image stack with defocusing within the object space.

Alternatively, the defocusing can also be achieved by changing the distance between the sample 2.1 and the objective 4, that is, by defocusing in the object space as is shown in FIG. 4. In this case, the distance between the receiving surface of the CCD camera 5 and the objective 4 or pupil plane 8, for example, remains constant.

The adjustment of the sample in direction of the optical axis 7 and the selection of different defocusing positions result in different wavefront deformations in the pupil plane 8 which lead to different intensity sections that are associated with the individual defocusing positions as is shown in FIG. 4.

In the next method step, the quality of the images and the image information is improved, for example, according to known methods of image processing, in that the noise is suppressed, only the intensity values above a threshold are taken into account for the subsequent evaluation, and measurement data are filtered and/or subjected to equalization.

Accordingly, local sensitivity differences of the CCD camera 5 are compensated at the same time. Further, the intensity centroid of every image is centered on a predetermined point in the image so that the intensity centroids lie on a straight line, for example, in positions $A_{ij}$, $B_{ij}$, $C_{ij}$, $D_{ij}$ and $E_{ij}$ (see FIG. 2).

In the following, the invention will be explained in more detail with reference to an optical imaging system, according to FIG. 5, comprising the subassemblies which are shown schematically in FIG. 1.

The following is assumed for this optical imaging system:
the sample has a pinhole with a diameter $d_{pH}$=300 nm;
illumination light with the wavelength of 248 nm is used;
the pixel size at the sample is 45 nm;
the numerical aperture of the imaging system is 0.2;
the illumination aperture corresponds to the numerical aperture of the imaging system;
the illumination of the sample is carried out with partially coherent light at sigma≈0.8;
the diameter of the Airy disk in the image is 1.512 μm;
the depth of focus is 6.2 μm;
the defocusing from image to image is carried out within the depth of focus range at ±1 RE (RE=Rayleigh unit), ±3 RE and ±0.8 RE or ±6.2 μm, ±18.6 μm and ±5 μm; and
the selected number of images is 21.

Figure 6:
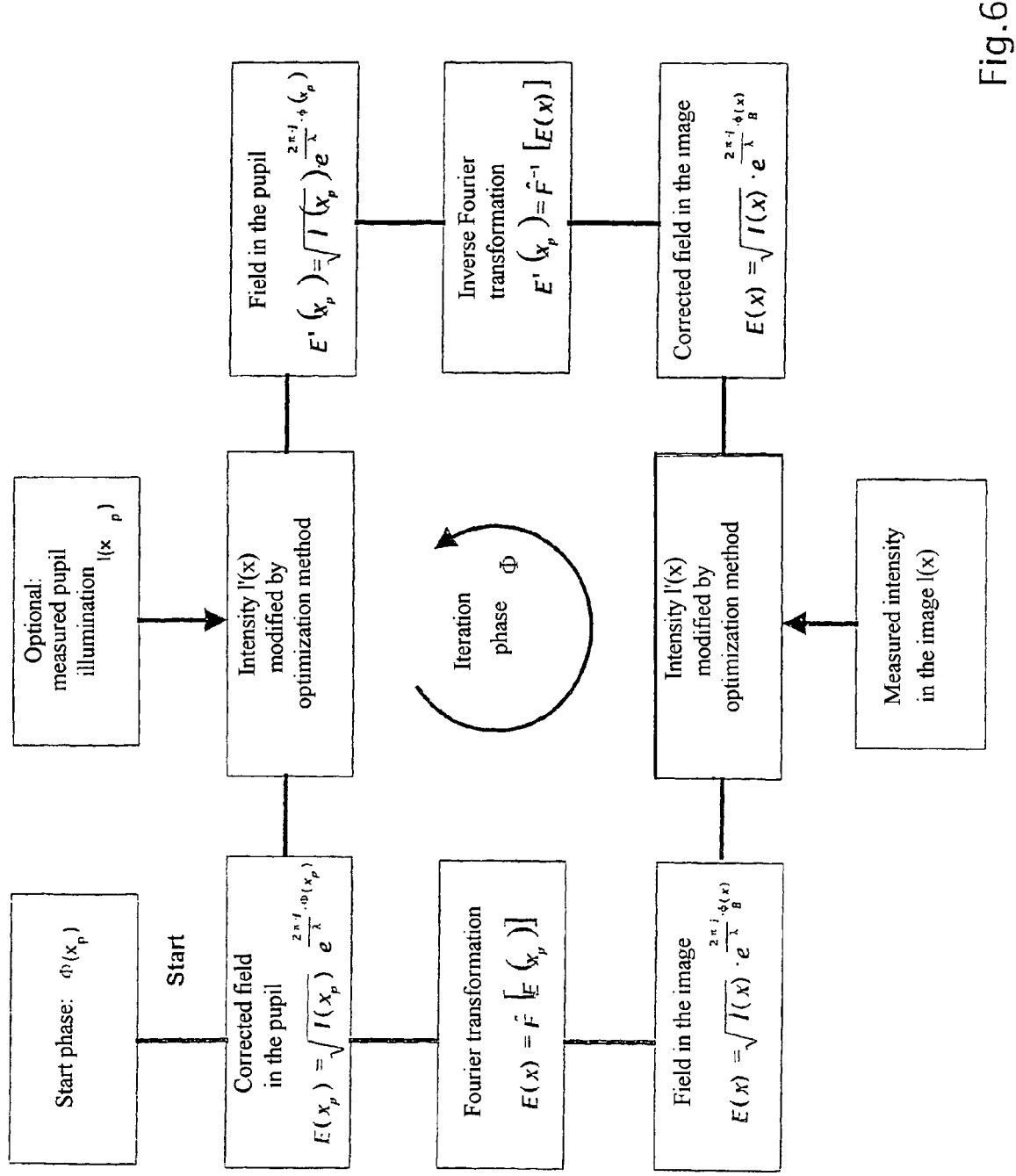
FIG. 6 illustrates the basic procedure for evaluation by iteration.

These data and the image information from the image stack are taken as the basis for the subsequent evaluation in which the following procedure is followed in practice:

the characteristic numbers for the image quality of the imaging system are determined analytically by the extended Zernike method;

two-dimensional iteration is carried out using Marquardt-Levenberg optimization in iteration steps, shown, for example, in FIG. 6;

object space defocusing is partially taken into account.

The results of the evaluation are indicated in the value table in FIG. 7 which also shows, among other things, the static Zernike values depending on an indexing after fringe scaling 1 to 25 as a description of the image quality.

Figure 5:
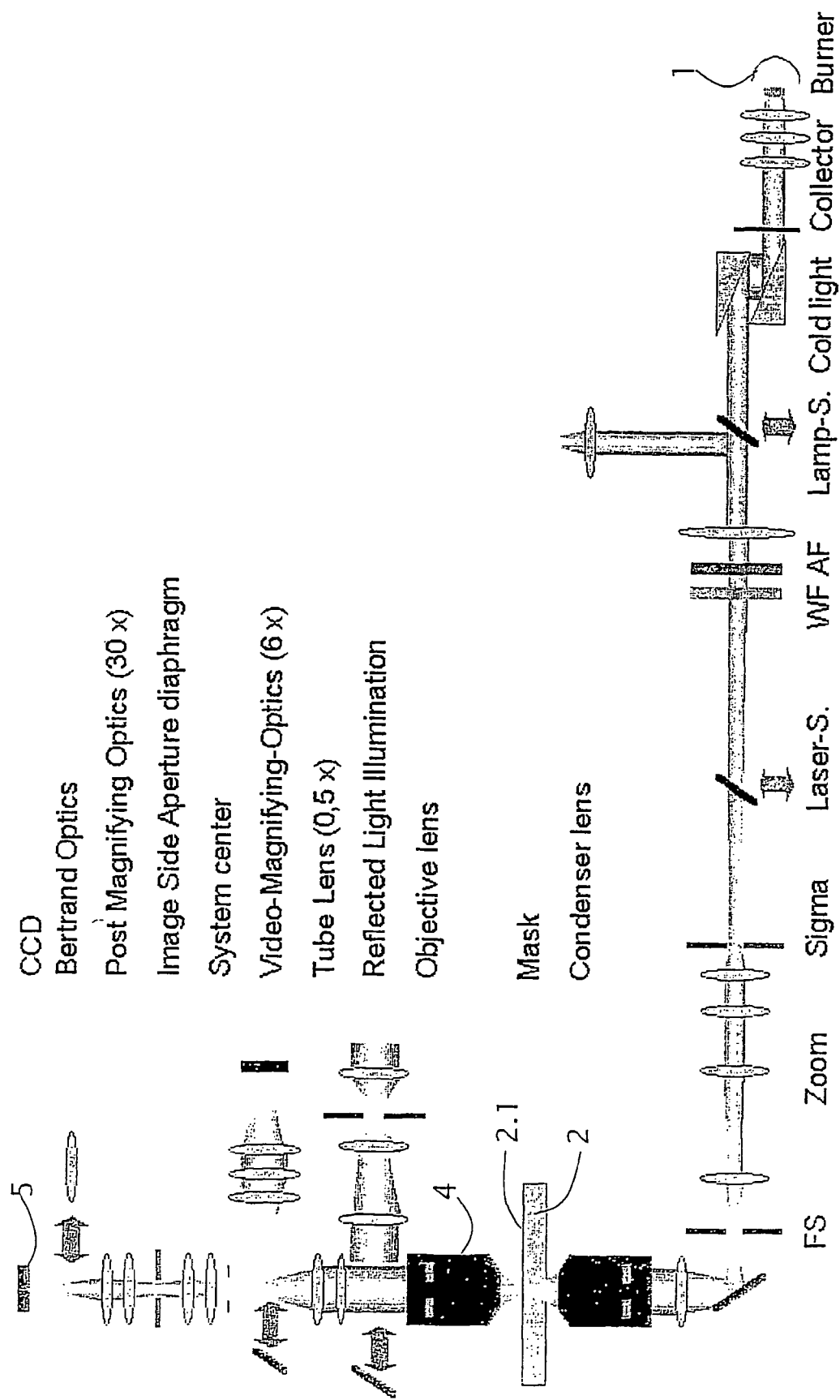
FIG. 5 shows a view of a practical optical imaging system.

This presents concrete evidence of the image quality for the imaging system according to FIG. 5. This evidence can be supplied to the customer, e.g., as a certificate, upon delivery of a corresponding device for further use or can be made available for customer service. For example, the quality of the imaging system can be determined and documented also on location at regular intervals or on demand.

The method according to the invention has been explained primarily in connection with microscope imaging systems. Of course, it is also possible and advantageous to apply the method according to the invention in connection with other systems, particularly with all systems which image at a finite distance, such as binoculars, projectors, geodetic optical devices, camera systems, photographic apparatus, medical observation instruments and, as the case may be, also in stepper optics and scanner optics. In principle, it is possible to apply the method according to the invention for all optical systems that image a sample or an object. The method according to the invention is extensively independent of wavelength and can therefore be used in principle for all wavelengths.

The expression "wavefront deformation" used in the description of the invention relates to deviations relative to a predetermined wavefront; it is not always desirable that an imaging system generates a plane wavefront. By extension, this also applies to the expression "imaging error".

The possibility of graduated method steps according to the invention is particularly advantageous for determining the characteristic numbers in analytic and iterative steps. Further, graduation of the iterative method steps, per se, is also conceivable in that the iteration is carried out in multiple steps.

As regards allowing for object space defocusing in the determination of results, it should be noted that the iteration suggested according to the invention should be carried out initially without additional parameters for the object space defocusing so as to arrive at the range of desired result values as quickly as possible. When the range of resulting values is found, e.g., characterized by transition parameters such as the ratio of residuals to signal-to-noise ratio in the respective image, quantity of iteration loops, duration of iteration, slight deviations in the results of an actual iteration cycle relative to the preceding iteration cycle, etc., the computing method should be expanded by parameters relating to the object space defocusing, and the parameter space of the variables can also be enlarged at the same time, or doubled in case of linear development of the object space defocusing.

Directly presetting the object space defocusing can also disadvantageously lead to errors because of the many parameters to be preset. For this reason also, iteration can initially be carried out without taking into account the object space defocusing, and the object space defocusing is only taken into account in later, likewise iterative, method steps. Improved stability and convergence of the computing process can be achieved in this way.

Further, it is also conceivable to directly allow for the object space defocusing analytically, although this can also lead to the possible error rate, or to allow for the object space defocusing analytically followed by one or more iterative steps and, depending on the preset, initially without allowing for the object space defocusing thereafter.

The image quality need not necessarily be represented in the form of Zernike coefficients as is indicated by way of example in the description of the invention. When the image quality is described in the form of Zernike coefficients, there is no information contained therein concerning, e.g., scattered light, contrast, distortions, image sequence in defocusing, transmission, field, image field curvature, image inclination, or dispersion. Insofar as this information is also significant or at least desirable with respect to the assessment of imaging systems, it can be determined by further examination based on the measured and simulated image stacks of known samples or from the image centering.

While the foregoing description and drawings represent the present invention, it will be obvious to those skilled in the art that various changes may be made therein without departing from the true spirit and scope of the present invention.

REFERENCE NUMBERS 1 illumination device
2 sample holder
3 object plane
4 objective
5 CCD camera
6 image plane
7 optical axis
8 pupil plane

What is claimed is:

1. A method for determining image quality of an optical imaging system, said method comprising the following steps:
    recording an image stack which includes a plurality of individual images of a sample from different adjusting or reference planes near a focus plane;
    improving image qualities of the individual images of the image stack by means of image processing; and
    evaluating the image stack with the aim of determining characteristic numbers that are characteristic of wavefront deformation caused by the imaging system;
    wherein the characteristic numbers are outputted and associated with the imaging system as equivalent for the image quality.

2. The method according to claim 1;
    wherein the characteristic numbers are determined in a first step initially by analytic evaluation and, in a subsequent second step, by further iterative processing of the results from the first step until a given termination criterion is reached.

3. The method according to claim 1;
    wherein a determination of Zernike polynomials up to a given order is carried out with the analytic evaluation of the image information.

4. The method according to claim 2;
    wherein a determination of Zernike coefficients is carried out with the iterative evaluation of the image information based on methods in which every wave surface from the image stack of the sample is considered as a unit, or a pixel-by-pixel evaluation is carried out; and
    wherein the determined Zernike coefficients correspond to the outputted characteristic numbers.

5. The method according to claim 1;
    wherein the change of reference plane always takes place in the object space, i.e., by changing the distance of the sample relative to the object plane.

6. The method according to claim 1;
wherein the change of reference plane is carried out in predetermined increments.

7. The method according to claim 2;
wherein a number of variables in the iterative step of the evaluation is increased, preferably doubled, in relation to the preceding, analytic step.

8. The method according to claim 1;
wherein the influence of a pupil of the imaging system is taken into account in the evaluation of the image information, preferably by means of a pupil image that is obtained using a Bertrand system.

9. The method according to claim 1;
wherein a pupil function is predetermined with respect to apodization.

10. The method according to claim 1;
wherein a plurality of detection devices are arranged at different distances to the focus plane and the images are accordingly recorded from the different reference planes at the same time or also successively in time with a corresponding control.

11. The method according to claim 1;
wherein a plurality of samples arranged adjacent to one another or a sample with a plurality of objects arranged adjacent to one another is positioned in the sample holder and information concerning the image qualities of the individual images are accordingly determined simultaneously in relation to the corresponding positions in the visual field of the imaging system, and/or simultaneous measurements are carried out with a plurality of different wavelengths in order to detect dispersive or wavelength-dependent effects.

12. The method according to claim 1;
wherein samples with binary objects, i.e., pure amplitude objects, are provided.

13. The method according to claim 12;
wherein each binary object is in the form of a round or square pinhole.

14. The method according to claim 1;
wherein the image quality is determined in an automatic process beginning with the positioning of a sample until the output of the characteristic numbers.

15. The method according to claim 1;
wherein an exposure device is provided which ensures an optimal illumination of the sample depending on the change of the reference plane, and the signal-to-noise ratio is accordingly optimized in the images.

16. The method according to claim 1;
wherein a laser beam having a beam waist in the object plane is provided for illuminating the sample in order to achieve a low sigma value and a Gaussian intensity distribution in the pupil.

17. The method according to claim 1;
wherein the characteristic numbers are outputted as Zernike coefficients.

18. The method according to claim 1;
wherein improving the image quality of the individual images of the image stack is related to improving the signal to noise ratio.

19. The method according to claim 1;
wherein an initially still unknown sample is recorded by the optical imaging system and the sample characteristics are separated from the characteristics of the imaging system.

20. The method according to claim 1;
wherein the influence of a stepper in microlithography is factored into the characteristics of the initially still unknown sample image.

21. The method according to claim 13;
wherein the pinhole has a diameter $d_{PH}$=300 nm, illumination light with the wavelength of 248 nm is used, the pixel size at the sample is 45 nm, the numerical aperture of the imaging system is 0.2, the illumination aperture corresponds to the numerical aperture of the imaging system, the illumination of the sample is carried out with partially coherent light at a $\sigma$=0.8, the diameter of the Airy disk in the image is 1.512 µm, the depth of focus is 6.2 µm, the defocusing from image to image is carried out within the depth of focus range at ±1 RE (RE=Rayleigh unit), ±3 RE, and ±0.8 RE or ±6.2 µm, ±18.6 µm, and ±5 µm, and an odd-number quantity of images is predetermined, preferably a quantity of 7, 11, or 21 images.

22. The method according to claim 13;
wherein a deconvolution of the image information is provided depending upon the size of the pinhole in the sample in order to exclude the influence of the pinhole size on the results.

23. A method for determining image quality of an optical imaging system, said method comprising the following steps:
recording an image stack which includes a plurality of individual images of a sample from different adjusting or reference planes near a focus plane;
improving image qualities of the individual images of the image stack by means of image processing; and
evaluating the image stack with the aim of determining characteristic numbers that are characteristic of wavefront deformation caused by the imaging system;
wherein samples with binary objects, i.e., pure amplitude objects, are provided.

24. A method for determining image quality of an optical imaging system, said method comprising the following steps:
recording an image stack which includes a plurality of individual images of a sample from different adjusting or reference planes near a focus plane;
improving image qualities of the individual images of the image stack by means of image processing; and
evaluating the image stack with the aim of determining characteristic numbers that are characteristic of wavefront deformation caused by the imaging system;
wherein an initially still unknown sample is recorded by the optical imaging system and the sample characteristics are separated from the characteristics of the imaging system.

* * * * *